V. H. EMERSON.
METHOD OF MANUFACTURING SOUND RECORDS.
APPLICATION FILED JAN. 21, 1920.
1,353,522.
Patented Sept. 21, 1920.
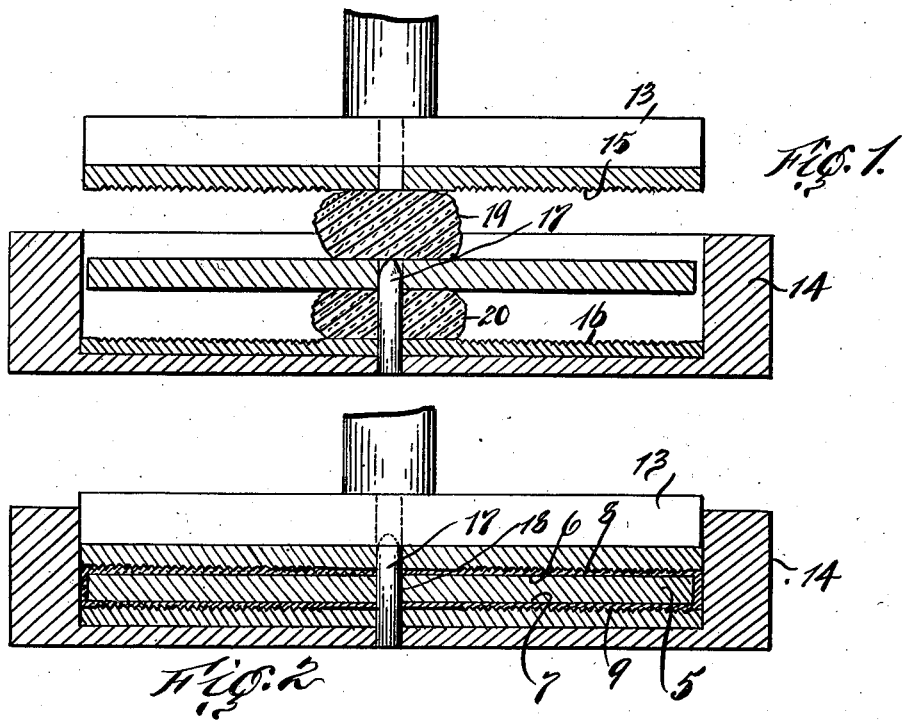
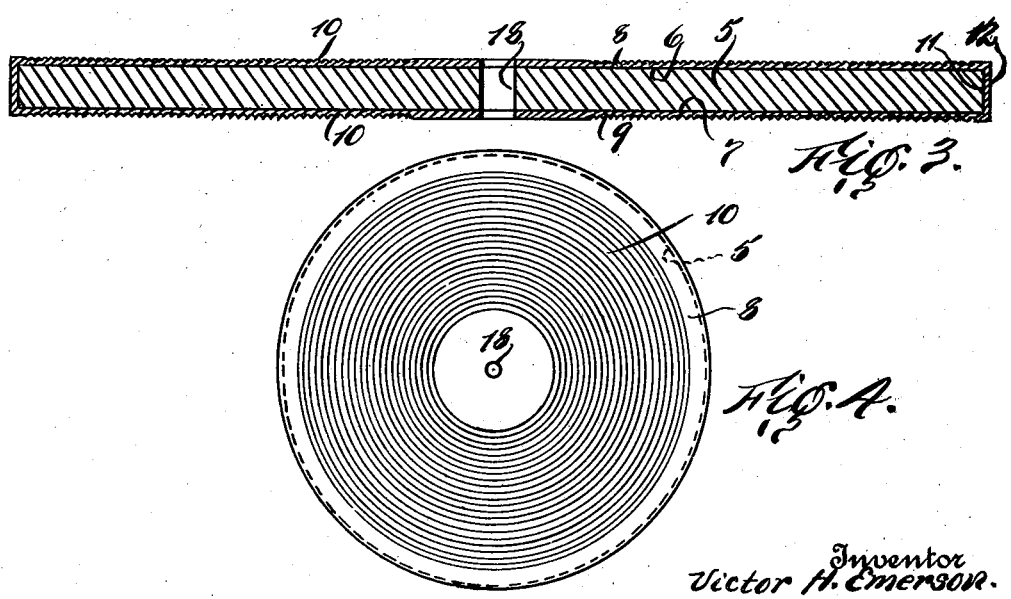
Inventor
Victor H. Emerson.
By his Attorney
Maurice Block

UNITED STATES PATENT OFFICE.

VICTOR H. EMERSON, OF NEW YORK, N. Y.

METHOD OF MANUFACTURING SOUND-RECORDS.

1,353,522.  Specification of Letters Patent.  Patented Sept. 21, 1920.

Application filed January 21, 1920. Serial No. 352,942.

*To all whom it may concern:*

Be it known that I, VICTOR H. EMERSON, a citizen of the United States of America, residing at New York city, county and State of New York, have invented certain new and useful Improvements in Methods of Manufacturing Sound-Records, of which the following is a full, clear, and exact description.

This invention relates to improvements in sound-producing record-disks, one of the objects being to produce an inexpensive record-disk having fine reproducing qualities, for the reason that the surface containing the record will be free from any hard particles or inequalities that would act to impair the tones. Certain types of record-disks are formed by superimposing upon a backing disk, in the form of a relatively thin layer, a composition having a very fine or smooth grain or made up of minute particles, while the backing disk itself is made up of a cheaper composition having a coarser grain, the relatively thin layer being composed of material which is much more expensive than the material out of which the backing disk is formed, the object being to cut down the expense of record-disk production in this manner. The record impression will, of course, be carried by the superimposed layer. In the course of manufacture of these record-disks, heated dies are usually used, and both the backing-disk and outer layer are ordinarily made of plastic material and are in plastic condition when acted upon by the dies. When the dies are brought together to spread the material for the outer layer over the surface of the backing disk, the coarser particles of the backing disk are liable to protrude and become embedded in the thin outer layer and thus mixed therewith, with the consequent liability of producing hard spots and unevenness in the record and also indentations should said hard particles be forced out of the record by the action of the reproducer-needle.

To obviate the above mentioned objectionable features, I form my improved record-disk by superimposing upon a relatively cool and prehardened backing-disk a relatively thin layer of suitable material. During the process of forming the record-disk by heated dies, the backing-disk will remain cool and being hard the plastic material out of which the outer layer is formed will flow freely and evenly over the surface of the backing-disk and become uniformly spread. As the backing-disk is relatively cool and not plastic to an extent that would permit the particles of which it is composed from becoming embedded or mixed with the more plastic finer grained material of the outer layer or layers, a much finer record-disk can be produced; in other words, with my process practically no imperfect records result in the course of production, with the consequent saving of the cost of material and labor, which is lost in producing imperfect and unusable records.

I will now proceed to describe my invention in detail, the novel features of which will be pointed out in the appended claims, reference being had to the accompanying drawing, forming part hereof, wherein—

Figure 1 illustrates a sectional view of an arrangement of the parts preparatory to the formation of my improved record disk;

Fig. 2 illustrates a similar view, the parts being arranged to complete the record disk;

Fig. 3 illustrates a sectional view of a completed record disk; and

Fig. 4 illustrates a plan view, on a reduced scale, of the completed record disk.

My improved record disk consists of a core or backing disk 5 having applied to both surfaces 6 and 7 (in this instance), relatively thin layers 8 and 9, respectively, of material containing a record impression, indicated by 10. As I do not wholly rely upon the adhesion of the layers 8 and 9 to the disk 5 for the maintenance of the layers upon said disk, I cause the material out of which the layers are made to cover the peripheral surface 11 of the disk 5, as indicated at 12. It will therefore be apparent that the backing-disk 5 is completely enveloped by the outer shell or layers 8 and 9 and end wall 10 which is integral with the layers 8 and 9. To form the record-disk, I provide dies 13 and 14 which during the process of applying the outer covering for the backing disk are heated, said dies being cooled off after they have been brought together and the record-disk formed. The cooling of the dies causes the covering for the disk 5 to quickly harden.

Each die 13 and 14 will be provided with a matrix, indicated by 15 and 16, respectively, to make the record impressions 10. The lower die 14 will carry a pin 17. To form a record-disk, I first prepare a backing plate 5 having an opening 18 for the passage of pin 17. The backing plate 5 may consist of a composition containing about 20% copal or Indian-gum and 80% of a mixture of lamp-black and clay, or any other suitable composition of relatively inexpensive ingredients suitable for the purpose. After having formed the disk 5 in a suitable mold and allowing it to become cold, it will be sufficiently prehardened so as to be ready for the application of the more expensive and smooth or finer compositions, forming the outer layer or record carrying portions of the record-disk. The said outer layer will be applied while in plastic form and while heated. When a record is to be formed a mass of the finer plastic material will be placed in the lower die over the pin 17, as indicated in Fig. 1. Upon this mass will be placed the prehardened disk or core 5 of the coarser material, and upon the disk 5 a second mass of the finer plastic material will be placed. The masses of plastic material out of which the record carrying portions of the disk are made, are indicated by 19 and 20 in Fig. 1. After the elements mentioned have been placed as described, the dies will be brought together, said dies being heated, thereby causing the plastic masses to spread out and cover the adjacent surfaces of the core or disk 5. As can be seen in Fig. 1, the diameter of disk 5 will be less than the interior diameter of the lower die 14; hence when the dies are brought together the plastic material will be spread not only over the surfaces 6 and 7 of the disk 5, but also over the peripheral surface 11. At the edge or periphery of the disk 5, the plastic material will meet and mix; hence when the dies are cooled, said cooling taking place shortly after the dies are brought together, the plastic material will be transformed into a hard shell completely enveloping disk 5. During the operation above described, the matrices 15 and 16 will apply to the adjacent surfaces of the layers 8 and 9 the record impressions desired.

As has been stated, the backing or core disk 5 will be cold and hardened when placed in position in the die 14 and will remain cold and hard during the pressing operation. The surfaces 6 and 7 will, however, become heated sufficiently to cause the plastic material spread thereover to adhere thereto, but, generally speaking, the disk 5 will be comparatively cold and hard during the pressing operation. As the disk 5 will be cold and hard enough to resist warping, the plastic material spread thereover will therefore be applied to a smooth non-yielding surface and will in consequence be evenly and smoothly applied, much more so than if disk 5 was yieldable or in a heated plastic condition. As the core or disk 5 will be hard during the pressing operation, the material out of which it is formed will not commingle with the more plastic material applied to the surfaces thereof. In other words, the material of the core or disk 5 and the outer covering or shell applied thereto will not become an integral mass, and hence the coarser particles of the backing disk or core will not mix with the finer plastic material, constituting the surface covering, thereby avoiding the formation of hard spots and inequalities in the record carrying portion of the disk. In a completed disk the backing disk or core and the outer shell or covering will at all times practically be two separate and distinct masses which do not commingle one with the other.

While the drawing illustrates a record disk with two record surfaces, a single record disk can also be produced in like manner, by omitting the lower matrix 16. The outer layer, which receives the record impressions, may consist of about 33% shellac, 40% clay, 3% flock, 2% resin and 1% lamp black, or other suitable composition of a similar nature.

After the disk has been removed from the dies, the peripheral edge thereof may be finished off to present a smooth surface.

The masses of plastic material 19 and 20 are placed in ball formation centrally of the backing disk 5, so that when the matrix and heated die are forced against said disk, which is hardened and comparatively cool, the ball of heated plastic material will be evenly spread over the hard core or disk and unevenness of pressure will be resisted by the hard disk. The ball of plastic material being heated, is susceptible of being spread evenly over the hard surface independently of any heat absorbed from the dies.

Having described my invention, what I claim and desire to secure by Letters Patent is:

1. The method of forming a sound record-disk consisting in applying to a hard relatively cool backing disk a relatively thin layer of heated material suitable to receive the impressions of a record, said backing disk remaining hard and relatively cool during the operation of applying the said heated layer or layers.

2. The method of forming a double disk sound record consisting in applying to the entire surface of a pre-hardened relatively cool backing or core disk a layer of heated material suitable for receiving the impressions of a record, said backing disk remaining relatively cool and hard during the operation of applying the heated layer.

3. The method of forming a sound record disk consisting in applying to a backing member of prehardened material having a smooth surface a relatively thin layer of heated plastic material, said backing member remaining at a lower temperature than the heated plastic layer during the application of said layer.

4. The method of forming a sound record disk, consisting in compressing against a relatively hardened cool core or backing member, by means of a heated die and matrix, a ball of heated plastic material adapted to be spread over and evenly resisted by the hardened disk.

Signed at New York city, N. Y., this 19 day of January, 1920.

VICTOR H. EMERSON.

Witnesses:
 MAURICE BLOCK,
 EDWARD A. JARVIS.